United States Patent
Yang et al.

(10) Patent No.: US 9,202,089 B2
(45) Date of Patent: Dec. 1, 2015

(54) PORTABLE INTERFACE DEVICE ASSEMBLY AND INTERFACE DEVICE THEREOF

(71) Applicant: Chien-Kang Yang, Taipei (TW)

(72) Inventors: Chien-Kang Yang, Taipei (TW); Cheng-Yun Koo, Taipei (TW)

(73) Assignee: Chien-Kang Yang, Taipei (TW)

( * ) Notice: Subject to any disclaimer, the term of this patent is extended or adjusted under 35 U.S.C. 154(b) by 0 days.

(21) Appl. No.: 14/278,850

(22) Filed: May 15, 2014

(65) Prior Publication Data

US 2015/0069124 A1 Mar. 12, 2015

(30) Foreign Application Priority Data

Sep. 11, 2013 (TW) .............................. 102217086 U

(51) Int. Cl.
| | |
|---|---|
| *G06K 7/00* | (2006.01) |
| *G06K 19/077* | (2006.01) |
| *H01R 13/447* | (2006.01) |
| *H01R 31/06* | (2006.01) |

(52) U.S. Cl.
CPC ............ *G06K 7/0004* (2013.01); *G06K 7/0026* (2013.01); *G06K 19/07732* (2013.01); *G06K 19/07741* (2013.01); *H01R 13/447* (2013.01); *H01R 31/065* (2013.01)

(58) Field of Classification Search
CPC .......... H04M 1/72575; H04M 1/0274; H04M 17/103; H04M 17/106; H04M 2017/12; H04M 2017/14; H04M 1/04; H04M 2250/04; H04M 2250/14; H04M 1/185; H04M 1/6066; H04M 1/0254; H04M 1/0264; H04M 1/05; G06Q 20/3278; G06Q 20/341; G06Q 20/352; G06Q 20/3574; G06Q 20/3576; G06Q 20/20; G06Q 20/3223; G06Q 20/3227; G06Q 20/355; G06Q 20/401; G06Q 40/00; G06Q 10/00; G06Q 50/22; G06Q 10/02; G07F 7/1008; G07F 7/0886; G07F 11/002; G07F 15/003; G07F 7/06; G07F 7/0806; G06F 21/34; G06F 1/1632; G06F 13/385; G06F 1/1698; G06F 3/0483; G06F 13/4022; G06F 15/0291; G06F 1/1628; G06K 19/07707; G06K 19/07739; G06K 19/07773; G06K 19/005; G06K 19/06206; G06K 19/12; G06K 7/10881; G06K 19/0717; G06K 19/07732; G06K 19/07749; G06K 2017/0041; G06K 7/0004; G06K 7/10009

USPC .......................... 235/375, 449, 486, 487, 492

See application file for complete search history.

(56) References Cited

U.S. PATENT DOCUMENTS

| 7,575,481 B1 | 8/2009 | Liu |
| 2006/0083158 A1 | 4/2006 | Lee |

(Continued)

FOREIGN PATENT DOCUMENTS

| CN | 202512896 | * 10/2012 |
| JP | 3165776 U | 2/2011 |
| JP | 3194405 U | 11/2014 |

OTHER PUBLICATIONS

European Search Report, Date: Jan. 22, 2015, Application No. 14171341.2, Applicant: Yang, Chien-Kang.

*Primary Examiner* — Thien M Le

(74) *Attorney, Agent, or Firm* — SmithAmundsen LLC; Kelly J. Smith; Dennis S. Schell

(57) ABSTRACT

An interface device is for coupling a payment card to an electronic device so as to allow the electronic device to access the payment card. The interface device includes a housing, a switching unit movably connected to the housing, a circuit board brought to move relative to the housing by the switching unit, a card interface disposed on the circuit board, and a connecting interface to be coupled to the electronic device. The connecting interface and the circuit board cooperate to define a card slot for containing the payment card therein. The interface device is operable to switch between a retracted state, in which the connecting interface is contained in the housing, and an exposed state, in which the connecting interface protrudes from the housing.

18 Claims, 13 Drawing Sheets

(56) References Cited

U.S. PATENT DOCUMENTS

| | | |
|---|---|---|
| 2008/0026614 A1 | 1/2008 | Emerson et al. |
| 2008/0140902 A1* | 6/2008 | Townsend ..................... 710/306 |
| 2009/0061696 A1 | 3/2009 | Lin et al. |
| 2009/0089469 A1 | 4/2009 | Zeng et al. |
| 2009/0089496 A1 | 4/2009 | Huang |
| 2009/0255991 A1 | 10/2009 | Liao et al. |
| 2011/0237099 A1* | 9/2011 | Ni et al. ........................ 439/142 |
| 2012/0303282 A1* | 11/2012 | Jou ................................ 702/19 |
| 2013/0214701 A1* | 8/2013 | Forgey, II .................... 315/307 |
| 2014/0131443 A1* | 5/2014 | Smith ........................... 235/454 |

* cited by examiner

PORTABLE INTERFACE DEVICE ASSEMBLY AND INTERFACE DEVICE THEREOF

CROSS-REFERENCE TO RELATED APPLICATION

This application claims priority of Taiwanese Application No. 102217086, filed on Sep. 11, 2013.

BACKGROUND OF THE INVENTION

1. Field of the Invention

The invention relates to an interface device, more particularly to a portable interface device assembly that includes the interface device for serving as an interface between a payment card and an electronic device.

2. Description of the Related Art

A conventional portable peripheral device (e.g., a flash disk) is usually equipped with an interface device (e.g., a connector) for coupling with an electronic device, such as a personal computer. The conventional portable peripheral device may include a housing, a circuit board disposed within the housing, a storage unit disposed on the circuit board, and an interface device coupled to the circuit board and partly exposed from the housing. In operation, the interface device is coupled to the electronic device, allowing the electronic device to access the storage unit.

The interface device may also serve as an interface between other electronic components (e.g., a memory card, a payment card, etc.) having interfaces not compatible with the electronic device.

Moreover, it may be desired that the interface device be well-protected from external collisions, in order to prevent the interface device from malfunctioning.

SUMMARY OF THE INVENTION

Therefore, one object of the present invention is to provide an interface device that serves as an interface between a payment card and an electronic device.

Accordingly, an interface device of the present invention is for coupling a payment card to an electronic device so as to allow the electronic device to access the payment card via the interface device. The interface device comprises a housing, a switching unit, a circuit board, a card interface, and a connecting interface.

The switching unit is movably connected to the housing. The circuit board is mounted on the switching unit and is brought to move relative to the housing by the switching unit. The card interface includes a card terminal set disposed on the circuit board.

The connecting interface is configured to be electrically connected to a socket of the electronic device, and includes a terminal set and a shell member. The terminal set is disposed on the circuit board. The shell member is connected to the switching unit and surrounds the terminal set and the card terminal set. The shell member and the circuit board cooperate to define a card slot for containing the payment card therein, such that the payment card is electrically connected to the card terminal set.

The interface device is operable to switch between a retracted state, in which the connecting interface is contained in the housing, and an exposed state, in which the connecting interface protrudes from the housing.

Another object of the present invention is to provide a portable interface device assembly. Accordingly, a portable interface device assembly of the present invention is configured to be coupled to an electronic device, and comprises an interface device and a payment card. The payment card is coupled to the interface device so as to enable the electronic device to access the payment card through the interface device. The interface device includes a housing, a switching unit, a circuit board, a card interface, and a connecting interface.

The switching unit is movably connected to the housing. The circuit board is mounted on the switching unit and is brought to move relative to the housing by the switching unit. The card interface includes a card terminal set disposed on the circuit board.

The connecting interface is configured to be electrically connected to a socket of the electronic device, and includes a terminal set and a shell member. The terminal set is disposed on the circuit board. The shell member is connected to the switching unit and surrounds the terminal set and the card terminal set. The shell member and the circuit board cooperate to define a card slot for containing the payment card therein, such that the payment card is electrically connected to the card terminal set.

The interface device is operable to switch between a retracted state, in which the connecting interface is contained in the housing, and an exposed state, in which the connecting interface protrudes from the housing.

BRIEF DESCRIPTION OF THE DRAWINGS

Other features and advantages of the present invent ion will become apparent in the following detailed description of the preferred embodiments with reference to the accompanying drawings, of which.

DETAILED DESCRIPTION OF THE PREFERRED EMBODIMENTS

Figure 1:
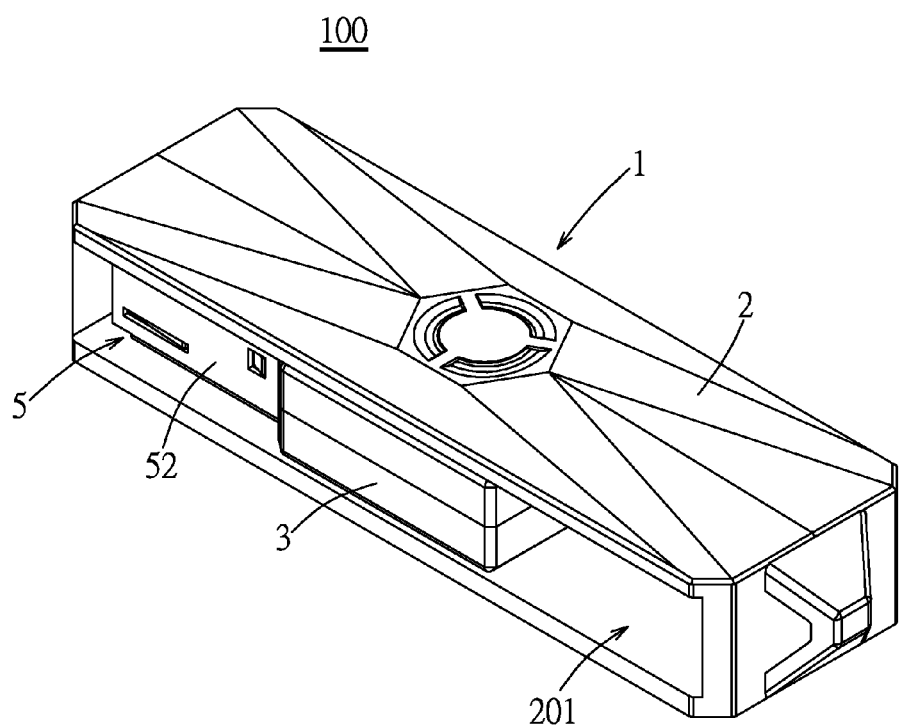
FIG. 1 is a perspective view of a first preferred embodiment of a portable interface device assembly according to the invention, where an interface device thereof is in a retracted state.

Before the present invention is described in greater detail, it should be noted that like elements are denoted by the same reference numerals throughout the disclosure.

Figure 2:
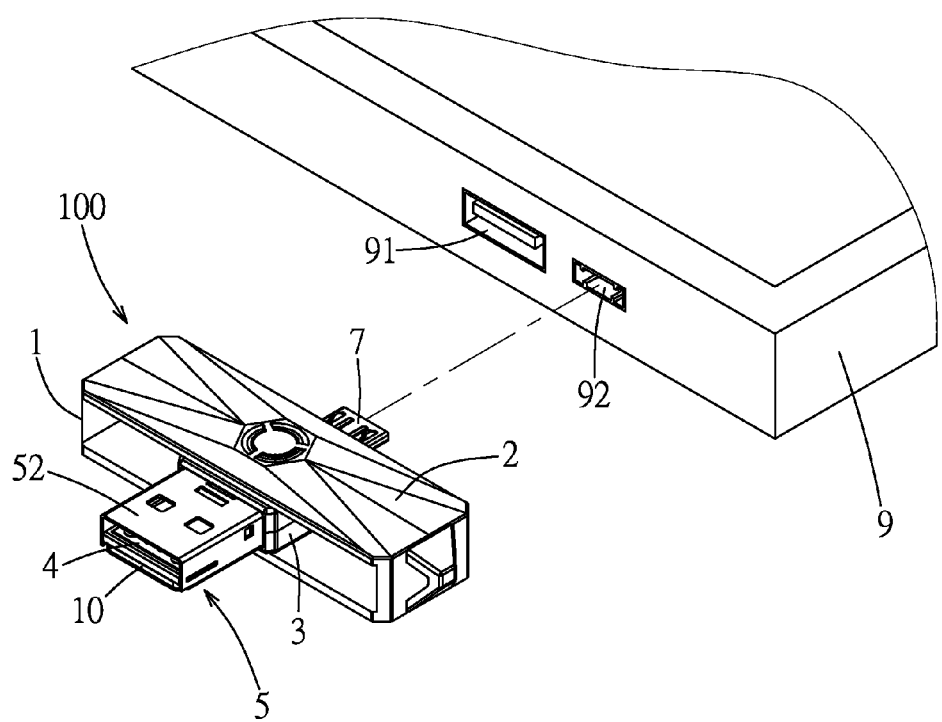
FIG. 2 is a perspective view of the portable interface device assembly of the first preferred embodiment, where the interface device is in an exposed state.

As shown in FIGS. 1 and 2, the first preferred embodiment of a portable interface device assembly 100 according to the present invention includes an interface device 1 and a payment card 10. The payment card 10 is to be coupled to the interface device 1 so as to enable an electronic device 9 to access the payment card 10 through the interface device 1.

FIG. 1 illustrates the interface device 1 being in a retracted state. FIG. 2 illustrates the interface device 1 being in an exposed state.

The electronic device 9 may be embodied as a device (such as a personal computer, a laptop computer, a mobile phone, a smart television, or the like) that includes an interface compatible to the interface device 1.

After a connection has been established between the electronic device 9 and the payment card 10, the electronic device 9 is able to proceed to handle functionalities associated with the payment card 10, such as a transaction. Since the feature of the present invention does not reside in the operations related to the manner in which the electronic device 9 handles the functionalities, details thereof will be omitted herein for the sake of brevity.

Figure 3:
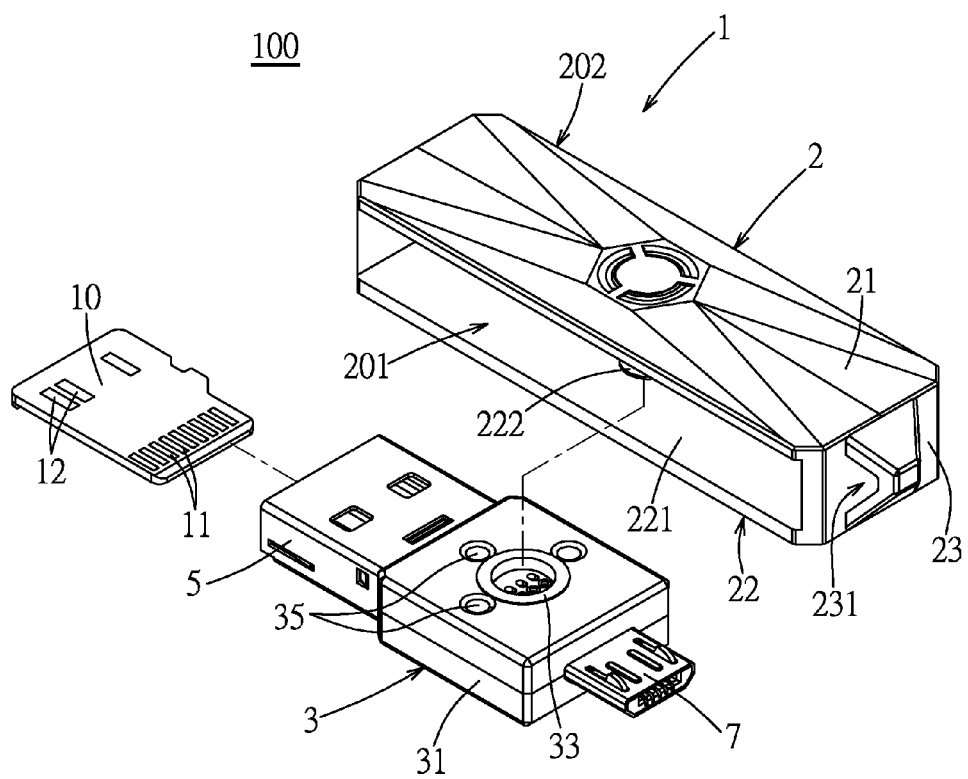
FIGS. 3 and 4 are exploded perspective views of the portable interface device assembly of the first preferred embodiment, viewed from different angles.
Figure 4:
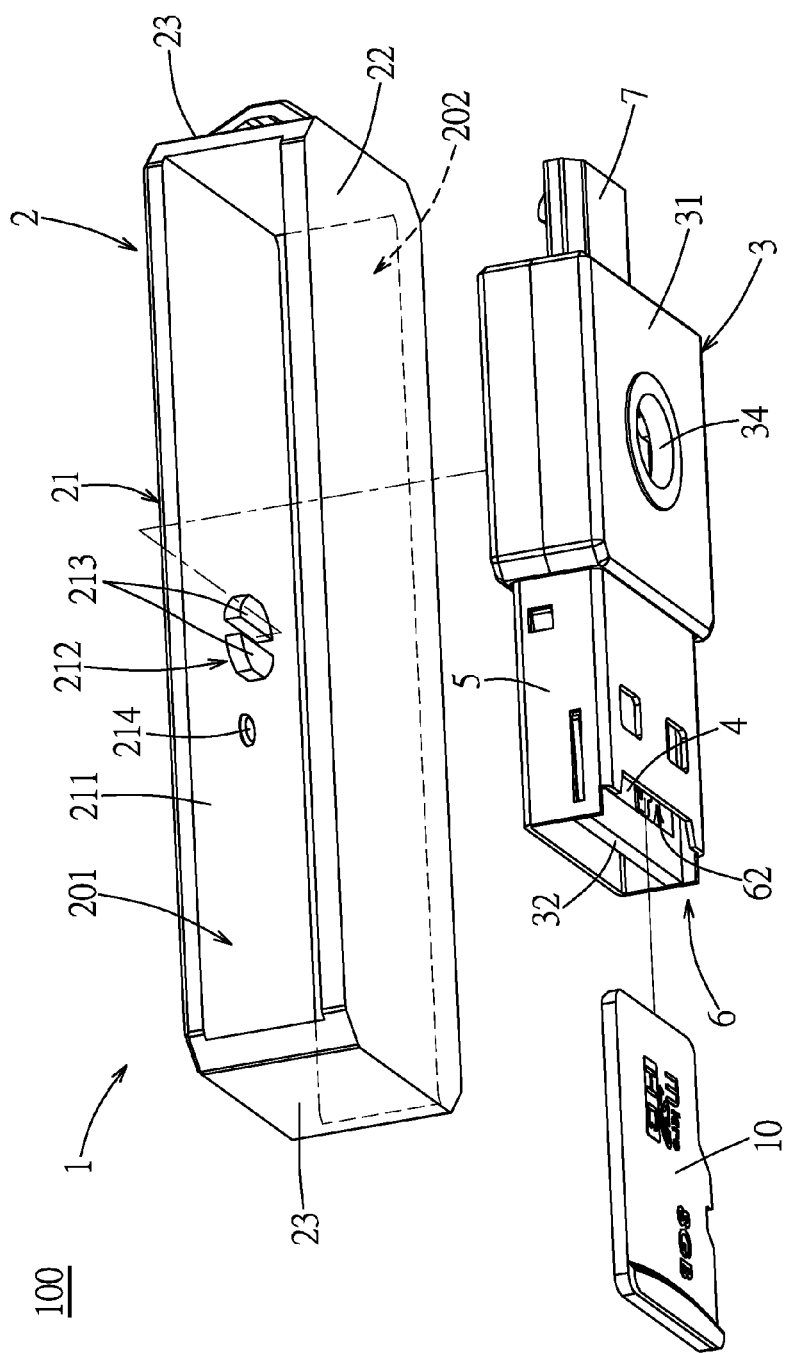

Further referring to FIGS. 3 and 4, the interface device 1 includes a housing 2, a switching unit 3, a circuit board 4, a first connecting interface 5, a card interface 6, and a second connecting interface 7.

In this embodiment, the first connecting interface 5, the card interface 6, and the second connecting interface 7 are integrated with the circuit board 4. In other embodiments, additional connecting interfaces may be further integrated onto the circuit board 4.

The housing 2 has an elongated shape with a pair of long sides and a pair of short sides (see FIG. 3), and includes a top wall 21, a bottom wall 22 and a pair of side walls 23. Each of the side walls 23 is disposed at a respective one of the short sides to interconnect the top wall 21 and the bottom wall 22. A through hole 231 may be formed in one of the side walls 23 for allowing a locking mechanism (e.g., a wire) to extend therethrough, thus enabling the interface device 1 to be attached to other objects, such as a purse or a portable device, as an accessory item.

The top wall 21 and the bottom wall 22 are not connected to each other at the long sides, thereby forming two openings 201, 202 at the long sides, respectively.

The switching unit 3 is movably connected to the housing 2, and includes a hollow base 31 and a frame 32 extending from a side of the base 31. In this embodiment, the switching unit 3 is rotatably connected to the housing 2. Operation of the switching unit 3 will be described in detail in the succeeding paragraphs.

Figure 5:
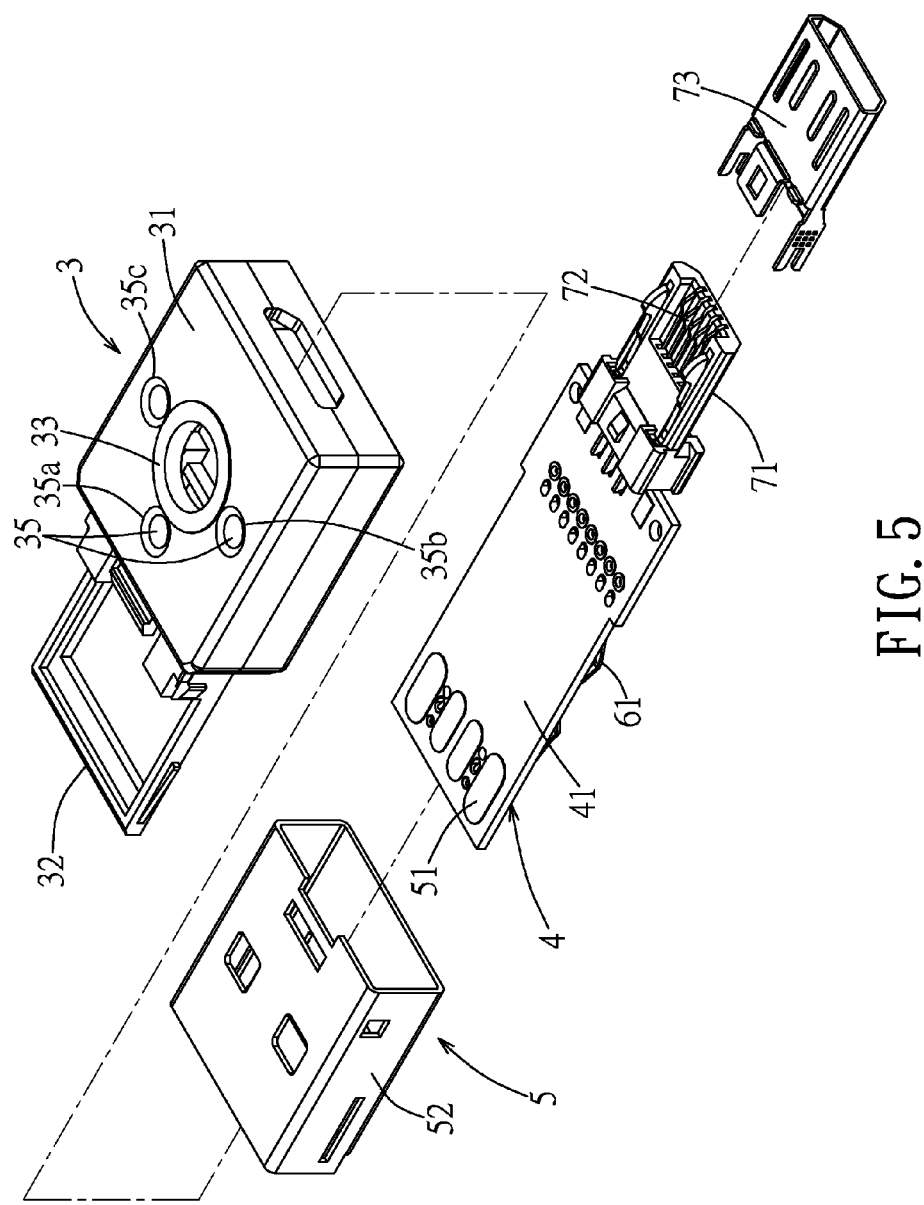
FIGS. 5 and 6 are exploded perspective views of the interface device of the first preferred embodiment viewed from different viewing angles, with a housing being omitted.
Figure 6:
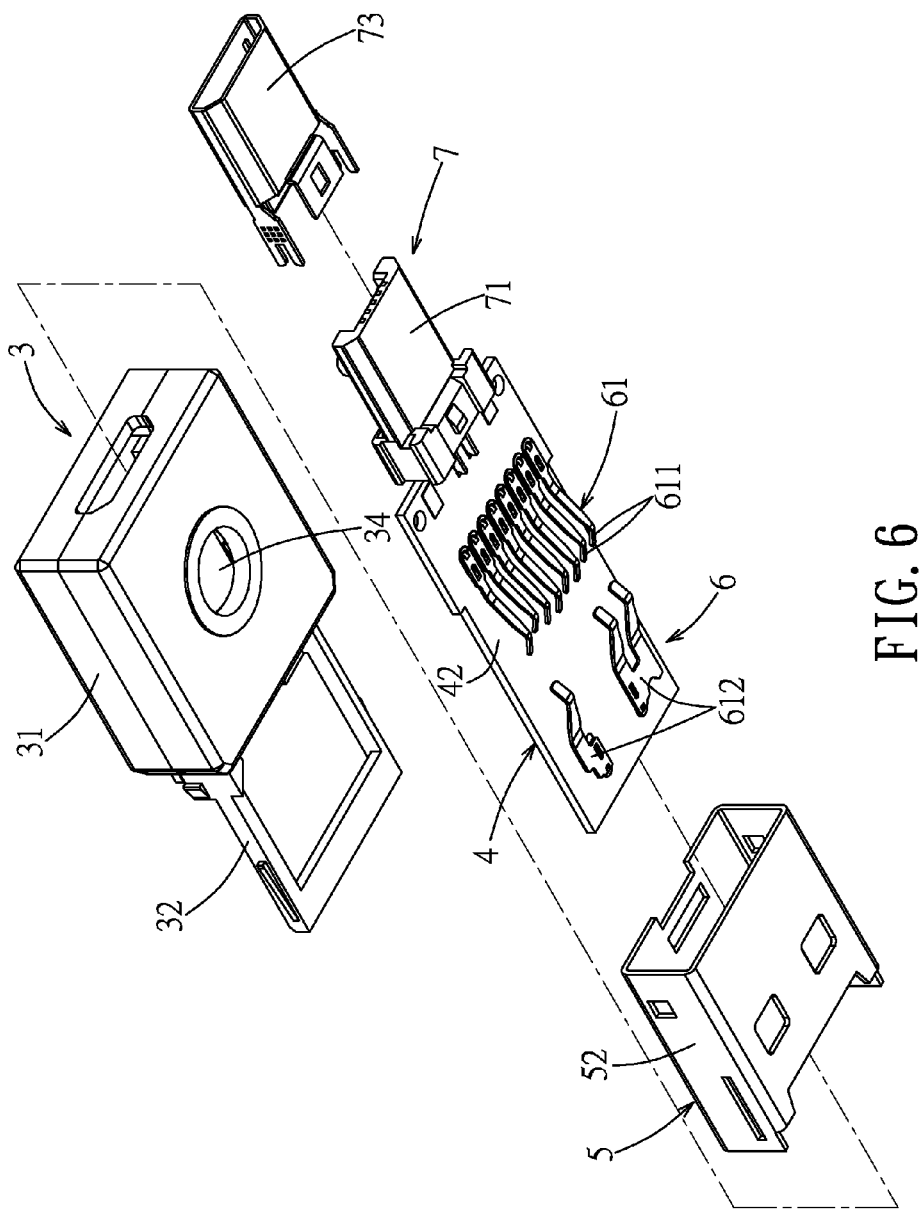

Further referring to FIGS. 5 and 6, the circuit board 4 has opposite first and second surfaces 41, 42, and has an elongated shape with a pair of long sides and a pair of short sides, similar to the housing 2. The circuit board 4 is mounted on the switching unit 3. Specifically, a part of the circuit board 4 is contained in the base 31, and another part of the circuit board 4 engages the frame 32. Consequently, the circuit board 4 can be brought to move relative to the housing 2 by the switching unit 3.

The first connecting interface 5 is provided on one of the short sides of the circuit board 4 at the frame 32 of the switching unit 3, and is configured to be electrically connected to a first socket 91 of the electronic device 9. The first connecting interface 5 may comply with the universal serial bus (USB) 2.0 or USB 3.0 standard, while the first socket 91 may be a USB socket that supports the USB 2.0 and USB 3.0 standard (see FIG. 2). Other connectivity standards may be employed to implement the first connecting interface 5 for connecting with various sockets of the electronic device 9.

The card interface 6 includes a card terminal set 61 that is disposed on the circuit board 4. The first connecting interface 5 includes a first terminal set 51 disposed on the circuit board 4, and a first shell member 52. The first shell member 52 is connected to the switching unit 3, and surrounds the first terminal set 51 and the card terminal set 61.

The first shell member 52 and the second surface 42 of the circuit board 4 cooperate to define a card slot 62 for containing the payment card 10, thereby enabling electrical connection between the payment card 10 and the card terminal set 61.

Specifically, in this embodiment, the payment card 10 is embodied using a micro Secure Digital (SD) card, and includes a plurality of standard pins 11 and three near field communication (NFC) pins 12 (see FIG. 3). In other words, the payment card 10 is incorporated with an NFC antenna, and supports NFC communication functionalities.

Accordingly, the card terminal set 61 includes a plurality of signal terminals 611 and three NFC terminals 612. Referring to FIG. 6, eight signal terminals 611 are incorporated.

The signal terminals 611 are spaced apart from each other, are arranged in a row, and are electrically and respectively connected to the standard pins 11 of the payment card 10. The NFC terminals 612 conform with the NFC specifications ("SD Specifications Part 1 NFC Interface Simplified Addendum" issued by the SD Card Association). In this embodiment, the NFC terminals 612 are spaced apart from one another, are arranged in a different row with respect to the row of the signal terminals 611, and are electrically and respectively connected to the NFC pins 12 of the payment card 10.

As a result, the payment card 10 coupled to the interface device 1 is enabled to interact with electronic devices that support NFC communication functionalities. In embodiments where the payment card 10 is not incorporated with an NFC antenna, the interface device 1 may be provided with an NFC antenna electrically connected to the NFC terminals 612, so as to cooperate with the electronic device 9 to execute the NFC communication functionalities.

The second connecting interface 7 is provided on the other one of the short sides of the circuit board 4 opposite to the first connecting interface 5, and is different from the first connecting interface 5. For example, while the first connecting interface 5 complies with the USB 2.0 or USB 3.0 standard, the second connecting interface 7 may comply with microUSB or miniUSB standard. In practice, the second connecting interface 7 may be configured to be electrically connected to a second socket 92 of the electronic device 9 (see FIG. 2), and includes an insulated base 71, a second terminal set 72, and a second shell member 73.

The insulated base 71 is fixed on the other one of the short sides of the circuit board 4. The second terminal set 72 is disposed on the insulated base 71 with a portion that is in electrical contact with the circuit board 4. The second shell member 73 is connected to the insulated base 71 and covers the second terminal set 72.

Referring to FIGS. 3 and 4, the top wall 21 of the housing 2 includes a top inner wall 211, and a top shaft 212 protruding perpendicularly from the top inner wall 211. The top shaft 212 includes two spaced-apart top shaft parts 213, which can be slightly brought toward each other when a clamping force is applied thereto. The bottom wall 22 of the housing 2 includes a bottom inner wall 221, and a bottom shaft 222 protruding perpendicularly from the bottom inner wall 221 and registered with the top shaft 212.

The base 31 of the switching unit 3 is further formed with a first shaft hole 33 for rotatably receiving the top shaft 212, and a second shaft hole 34 for rotatably receiving the bottom shaft 222.

Using the above configuration, the switching unit 3 is enabled to rotate relative to the housing 2, allowing the first connecting interface 5 and the second connecting interface 7 to be retracted within or exposed from the housing 2. That is, by virtue of the above configuration, the interface device 1 is operable to switch between the retracted state, in which the first connecting interface 5 and the second connecting interface 7 are contained in the housing 2 (see FIG. 1), and the exposed state, in which the first connecting interface 5 and the second connecting interface 7 protrude from the housing 2 (see FIG. 2).

When the interface device 1 is in the retracted state, the circuit board 4 (along with the first connecting interface 5, the card interface 6 and the second connecting interface 7 integrated thereon) is substantially parallel to the housing 2, containing the first connecting interface 5 and the second connecting interface 7 in the housing 2. When the interface device 1 is in the exposed state, the circuit board 4 is substantially perpendicular to the housing 2, resulting in the first connecting interface 5 and the second connecting interface 7 extending out of the housing 2 respectively through the openings 201, 202.

In other embodiments, various configurations may be applied to the housing 2 and the switching unit 3 to achieve the same effect. For example, only one pair of shaft 212 and first shaft hole 33 may be sufficient.

In order to position the switching unit 3 with respect to the housing 2, additional positioning mechanisms may be employed. In this embodiment, the housing 2 further includes a first positioning unit 214 (see FIG. 4) that is disposed on the inner wall 211, and that is spaced apart from the top shaft 212. The switching unit 3 further includes a plurality of second positioning units 35 that are disposed on the base 31 and that are shaped to engage the first positioning unit 214. Particularly, the first positioning unit 214 is a protrusion, and each of the second positioning units 35 is an engaging hole that is able to engage the protrusion.

Referring to FIG. 5, in this embodiment, three second positioning units 35 (denoted as 35a, 35b and 35c respectively) are provided. The second positioning units 35 are arranged around and spaced apart from the first shaft hole 33, and are angularly spaced apart from each other with respect to the first shaft hole 33 as a center. Adjacent two of the second positioning units 35 are angularly spaced apart from each other by 90 degrees with respect to the first shaft hole 33.

When the interface device 1 is in the retracted state, the first positioning unit 214 engages one of the second positioning units 35 (i.e., 35a). Alternatively, when the interface device 1 is in the exposed state, the first positioning unit 214 engages another one of the second positioning units 35 (i.e., 35b or 35c).

When engaging one of the second positioning units 35, positioning of the switching unit 3 is done by the engagement between the first positioning unit 214 and the one of the second positioning units 35, arresting rotational movement of the switching unit 3 relative to the housing 2, until a force sufficient to disengage the first positioning unit 214 from the one of the second positioning units 35 is applied.

While three second positioning units 35 are employed in this embodiment, various numbers of the second positioning units 35 may be incorporated in other embodiments to accommodate different requirements/applications.

In operation, when it is desired to access the payment card 10 (which is a microSD card) using an electronic device 9 having only the first socket 91 (a standard USB socket) and the second socket 92 (a microUSB socket) and no microSD card reader, the payment card 10 is first inserted into the card slot 62 of the interface device 1, and the switching unit 3 may be rotated from the retracted state to the exposed state (i e, by 90 degrees). Then, the interface device 1 is coupled to the electronic device 9 via the first socket 91 using the first connecting interface 5, or via the second socket 92 using the second connecting interface 7. In this manner, the electronic device 9 is operable to access the payment card 10 even though the electronic device 9 lacks the proper interface for accessing the payment card 10 directly.

Figure 7:
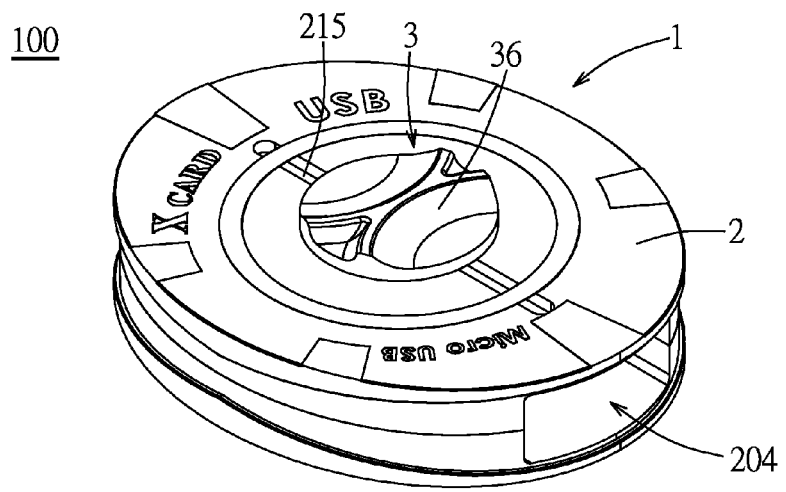
FIG. 7 is a perspective view of a second preferred embodiment of a portable interface device assembly, according to the invention, where an interface device thereof is in a retracted state.
Figure 8:
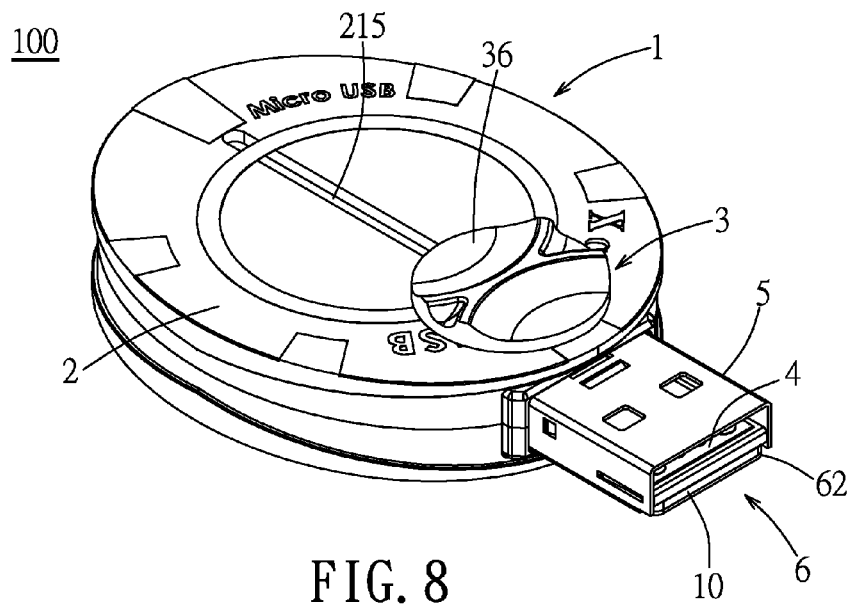
FIGS. 8 and 9 are perspective views illustrating the portable interface device assembly of the second preferred embodiment, where the interface device is in a first exposed state and a second exposed state, respectively.
Figure 9:
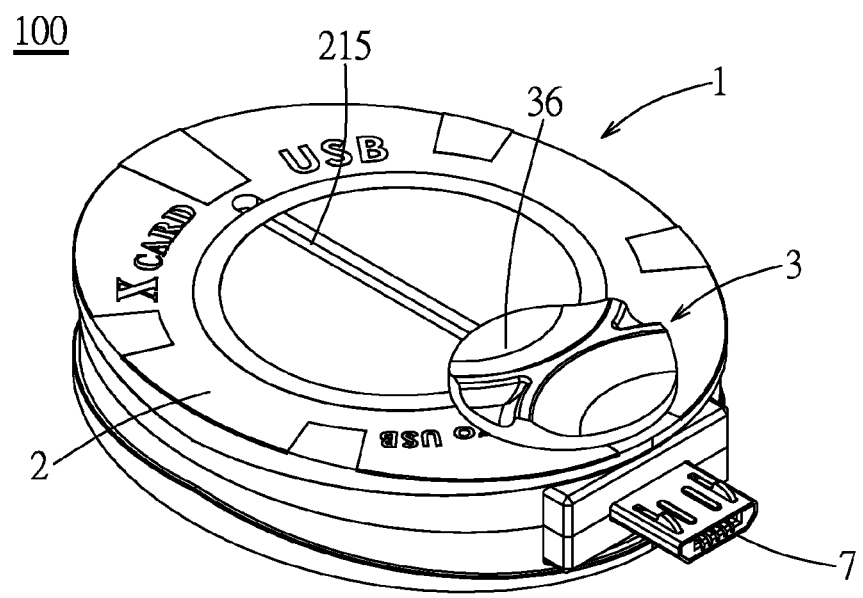

FIGS. 7 to 9 illustrate the second preferred embodiment of the portable interface device assembly 100 according to the present invention. FIG. 7 illustrates the interface device 1 of the second preferred embodiment in the retracted state. FIG. 8 illustrates the interface device 1 of the second preferred embodiment in a first exposed state, in which the first connecting interface 5 is exposed out of the housing 2. FIG. 9 illustrates the interface device 1 of the second preferred embodiment in a second exposed state, in which the second connecting interface 7 is exposed out of the housing 2.

The main difference between this embodiment and the previous embodiment resides in the configuration of the housing 2 and the interactions between the housing 2 and the switching unit 3.

Particularly, the housing 2 is substantially disk-shaped, and includes a pair of circular walls (namely, a top wall 21 and a bottom wall 22), and a peripheral wall 24 that interconnects the circular walls 21 and 22 and that is formed with a pair of openings 203 and 204. The top wall 21 is formed with a slide groove 215 radially extending and penetrating the top wall 21. The openings 203 and 204 are formed near respective ends of the slide groove 215, and are radially opposite to each other.

Figure 10:
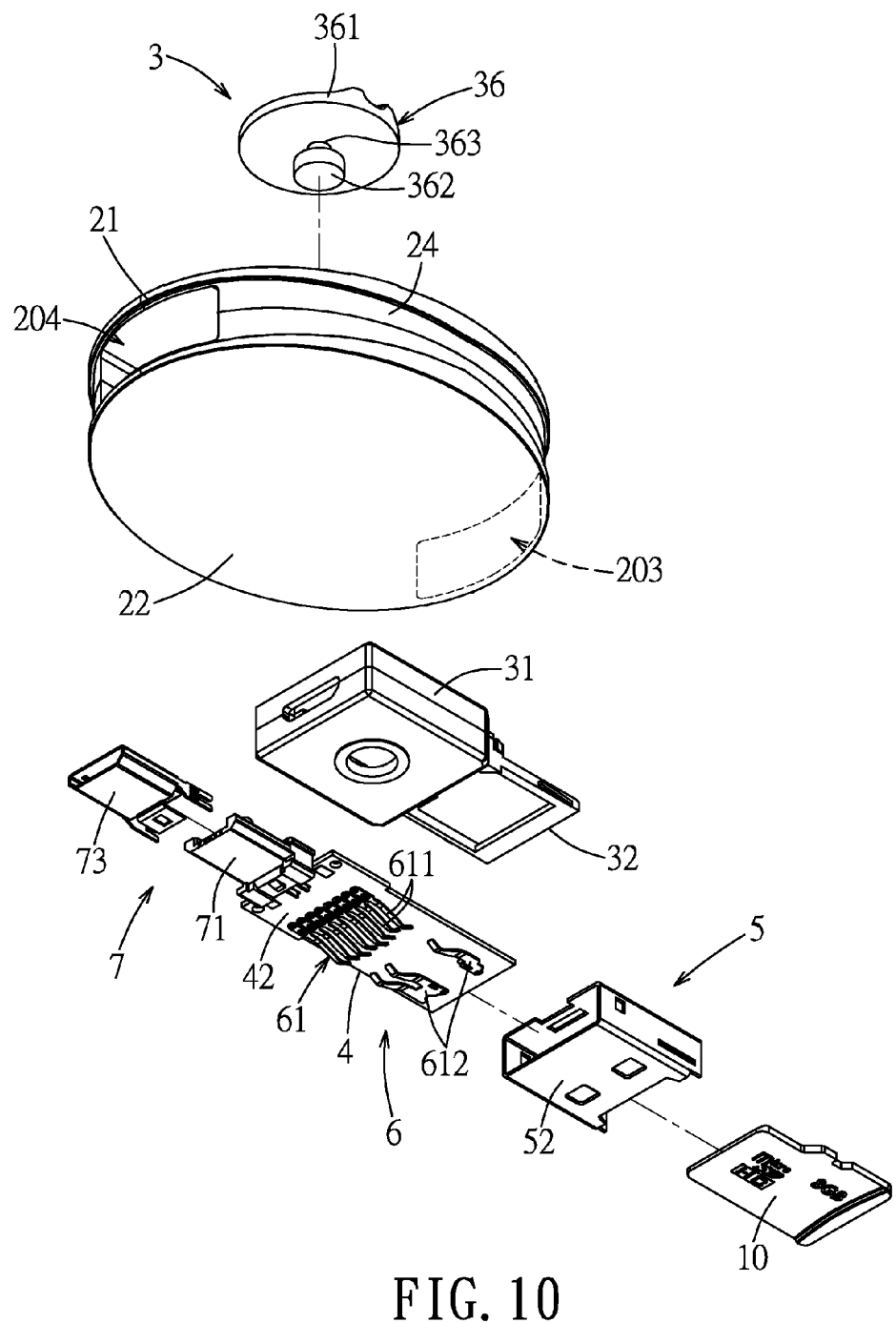
FIG. 10 is an exploded perspective view of the portable interface device assembly of the second preferred embodiment.
Figure 11:
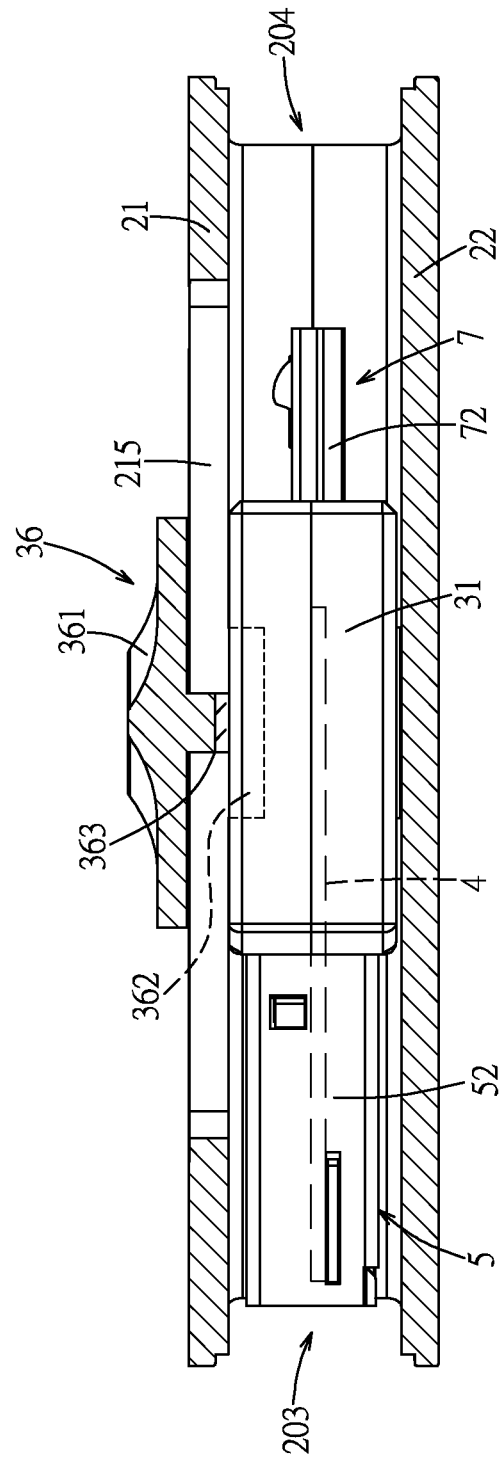
FIG. 11 is a sectional view illustrating the interface device of the second preferred embodiment in the retracted state.
Figure 12:
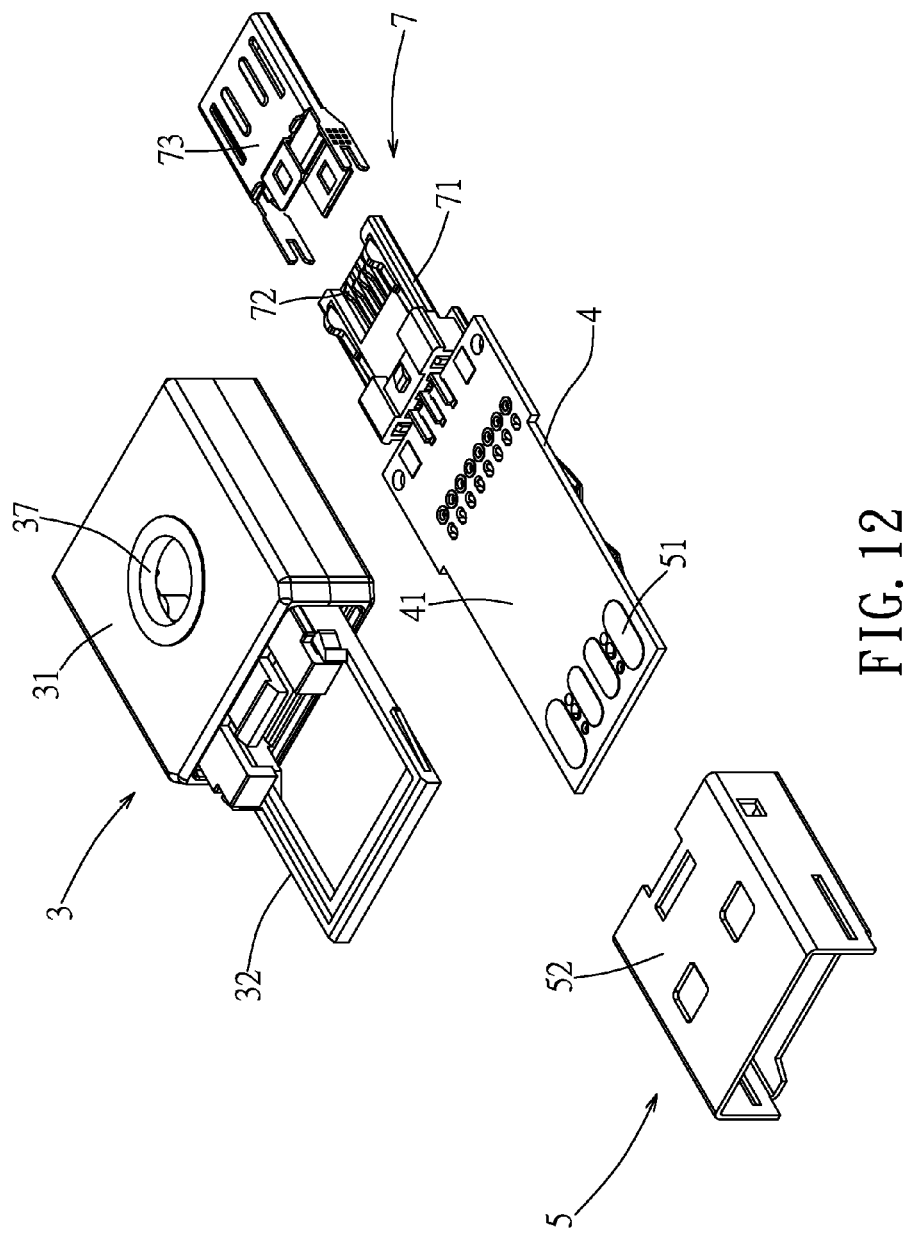
FIG. 12 is an exploded perspective view of the interface device of the second preferred embodiment viewed from a viewing angle different from that of FIG. 10 and with a housing being omitted.

Referring to FIGS. 10 to 12, the switching unit 3 further has a user-operable unit 36 disposed on the top wall 21, and a base 31 disposed in the housing 2 for mounting the circuit board 4.

The user-operable unit 36 has a manual operation member 361, a restricting member 362 and an interconnecting member 363. The manual operation member 361 is disposed outside the housing 2.

The restricting member 362 is disposed in the housing 2, and is connected to the base 31. In this embodiment, this is done by disposing the restricting member 362 fittingly in a retaining hole 37 formed in the base 31. The interconnecting member 363 has a rod shape, is disposed movably in the slide groove 215, and interconnects the manual operation member 361 and the restricting member 362. The interconnecting member 363 is dimensioned to have a diameter slightly smaller or equal to a width of the slide groove 215 for allowing the interconnecting member 363 to slide within the slide groove 215. A length of the interconnecting member 363 is configured to be slightly greater than a thickness of the top wall 21. Both the manual operation member 361 and the restricting member 362 are dimensioned to be unable to move through the slide groove 215 to prevent the user-operable unit 36 from disengaging the housing 2.

FIGS. 7 and 11 illustrate the interface device 1 in the retracted state. Here, the user-operable unit 36 is in an inner position of the top wall 21 radially away from the peripheral wall 24. That is, the user-operable unit 36 is substantially in the center of the disk-shaped top wall 21, and in the middle of the slide groove 215.

Figure 13:
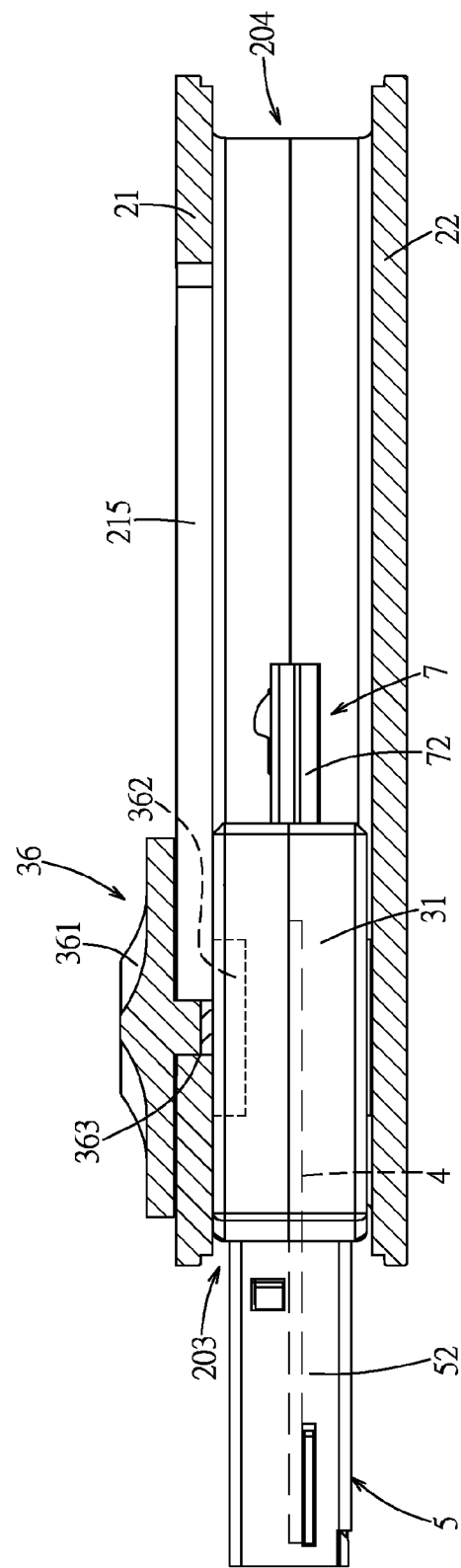
FIGS. 13 and 14 are sectional views illustrating the interface device of the second preferred embodiment being in the first exposed state and the second exposed state, respectively.

FIGS. 8 and 13 illustrate the interface device 1 in the first exposed state. Here, the user-operable unit 36 (along with the circuit board 4 and the components integrated thereon) is radially moved (for example, by the user) along the slide groove 215 toward the opening 203 in the peripheral wall 24 to a first outer position on the top wall 21, and the first connecting interface 5 extends out of the housing 2 through the opening 203.

Figure 14:
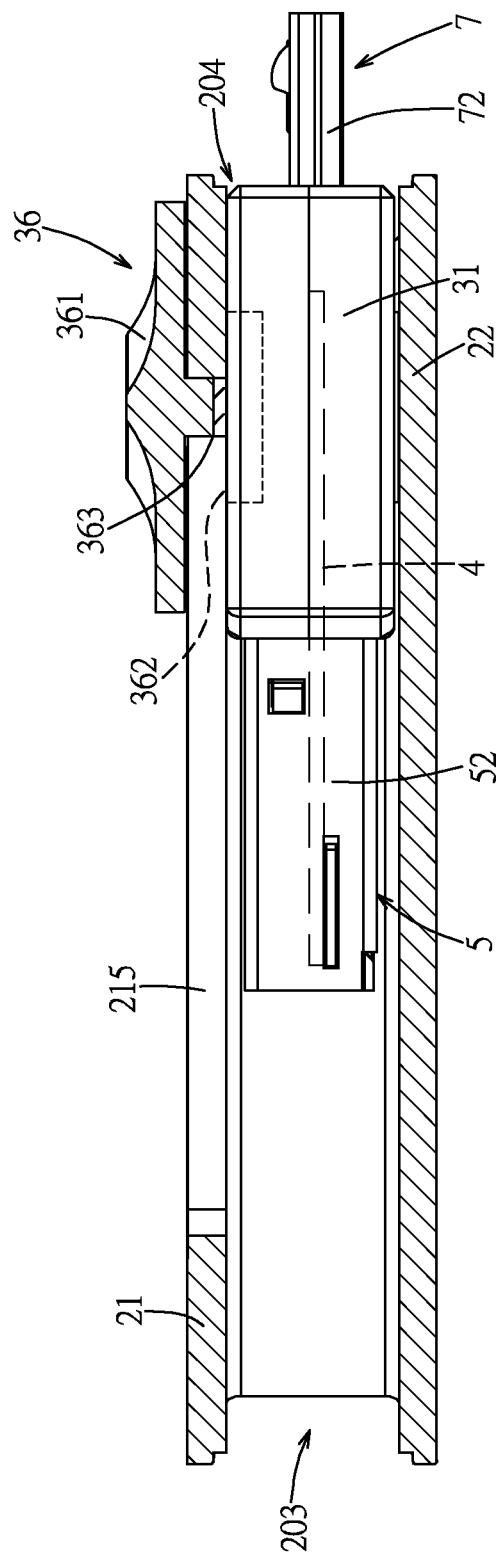

FIGS. 9 and 14 illustrate the interface device 1 in the second exposed state. Here, the user-operable unit 36 (along with the circuit board 4 and the components integrated thereon) is radially moved along the slide groove 215 toward the opening 204 in the peripheral wall 24 to a second outer position on the top wall 21, and the second connecting interface 7 extends out of the housing 2 through the opening 204.

The second preferred embodiment has the same advantages as those of the first preferred embodiment.

While, in the previous embodiments, the interface device 1 and the payment card 10 are considered as separate components, when the interface device 1 has the payment card 10 inserted therein, the combination of the interface device 1 and the payment card 10 may be considered to be a portable interface device assembly 100.

To sum up, embodiments of the present invention provide multiple interfaces for coupling the payment card 10 to the electronic device 9 that may not include the proper interface to access the payment card 10 directly. Additionally, the interface device 1 may incorporate the NFC standard to allow communication between the payment card 10 and the electronic device 9 using the NFC standard. Moreover, the interface device 1 may be switched between the retracted state and the exposed state, and undesired external collision with internal components may be prevented.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An interface device for coupling a payment card to an electronic device so as to allow the electronic device to access the payment card via said interface device, the payment card including a plurality of standard pins and three near field communication (NFC) pins, said interface device comprising:
    a housing;
    a switching unit movably connected to said housing;
    a circuit board mounted on said switching unit and brought to move relative to said housing by said switching unit;
    a card interface including a card terminal set disposed on said circuit board; and
    a first connecting interface configured to be electrically connected to a first socket of the electronic device, and including a first terminal set disposed on said circuit board and a first shell member connected to said switching unit and surrounding said first terminal set and said card terminal set, said first shell member and said circuit board cooperating to define a card slot for containing the payment card therein such that the payment card is electrically connected to said card terminal set;
    wherein said interface device is operable to switch between a retracted state, in which said first connecting interface is contained in said housing, and an exposed state, in which said first connecting interface protrudes from said housing;
    wherein said card terminal set includes:
        a plurality of signal terminals that are spaced apart from each other and are arranged in a row, and that are configured to be electrically and respectively connected to the standard pins of the payment card; and
        two NFC terminals that are spaced apart from one another and are arranged in a different row with respect to the row of said signal terminals, and that are configured to be electrically and respectively connected to said NFC pins of the payment card.

2. The interface device of claim 1, wherein:
    said circuit board has opposite first and second surfaces, said first terminal set is disposed on said first surface, and said card terminal set is disposed on said second surface; and
    said card slot is defined cooperatively by said second surface and said first shell member.

3. The interface device of claim 1, wherein:
    said housing has an elongated shape with a pair of long sides, each of said long sides being formed with an opening;
    said switching unit is rotatably disposed in said housing;
    said circuit board has an elongated shape with a pair of short sides, one of which being provided with said first connecting interface;
    when said interface device is in the retracted state, said circuit board is substantially parallel to said housing, containing said connecting interface in said housing; and
    when said interface device is in the exposed state, said circuit board is substantially perpendicular to said housing, resulting in said first connecting interface extending out of said housing through one of said openings.

4. The interface device of claim 3, further comprising a second connecting interface that is different from said first connecting interface, that is configured to be electrically connected to a second socket of the electronic device, and that includes:
    an insulated base fixed on the other one of said short sides of said circuit board;
    a second terminal set disposed on said insulated base with a portion that is in electrical contact with said circuit board; and
    a second shell member connected to said insulated base and covering said second terminal set;
    wherein, when said interface device is switched to the exposed state, said second connecting interface extends out of said housing through the other one of said openings.

5. The interface device of claim 3, wherein:
    said housing includes an inner wall, and a shaft protruding perpendicularly from said inner wall; and
    said switching unit includes a base, and a shaft hole formed in said base and rotatably receiving said shaft.

6. The portable interface device assembly of claim 5, wherein:
    said housing further includes a first positioning unit that is disposed on said inner wall and that is spaced apart from said shaft;
    said switching unit further includes a plurality of second positioning units that are disposed on said base, and that are shaped to engage said first positioning unit;
    said second positioning units are arranged around and spaced apart from said shaft hole, and are angularly spaced apart from each other with respect to said shaft hole as a center, adjacent two of said second positioning units being angularly spaced apart from each other by 90 degrees with respect to said shaft hole;

when said interface device is in the retracted state, said first positioning unit engages one of said second positioning units, and when said interface device is in the exposed state, said first positioning unit engages another one of said second positioning units.

7. The interface device of claim 1, wherein:

said housing is substantially disk-shaped, and includes a pair of circular walls, and a peripheral wall interconnecting said circular walls and formed with at least one opening; and when said interface device is in the retracted state, said switching unit is in an inner position on one of said circular walls away from said peripheral wall, and when switching said interface device to the exposed state, said switching unit is moved toward said peripheral wall to an outer position on said one of said circular walls, and said first connecting interface extends out of said housing through said opening.

8. The interface device of claim 7, wherein:

a slide groove is formed through said one of said circular walls;

said switching unit has a user-operable unit disposed on said one of said circular walls and a base disposed in said housing for mounting said circuit board; and said user-operable unit has
- a manual operation member disposed outside said housing,
- a restricting member disposed in said housing, dimensioned to be unable to move through said slide groove, and connected to said base, and
- an interconnecting member disposed movably in said slide groove and interconnecting said manual operation member and said restricting member.

9. The interface device of claim 8, wherein said peripheral wall is formed with two openings, said interface device further comprising a second connecting interface that is different from said first connecting interface, that is configured to be electrically connected to a second socket of the electronic device, that is mounted to said circuit board opposite to said first connecting interface and that includes:

an insulated base fixed on said circuit board;

a second terminal set disposed on said insulated base with a portion that is in electrical contact with said circuit board; and a second shell member connected to said insulated base and covering said second terminal set;

wherein, when said interface device is switched to the exposed state, said second connecting interface extends out of said housing through another one of said openings.

10. A portable interface device assembly configured to be coupled to an electronic device, said portable interface device assembly comprising an interface device, and a payment card that is coupled to said interface device so as to enable the electronic device to access said payment card through said interface device, said interface device including:

a housing;

a switching unit movably connected to said housing;

a circuit board mounted on said switching unit and brought to move relative to said housing by said switching unit;

a card interface including a card terminal set disposed on said circuit board; and a first connecting interface configured to be electrically connected to a first socket of the electronic device, and including a first terminal set disposed on said circuit board and a first shell member connected to said switching unit and surrounding said first terminal set and said card terminal set, said first shell member and said circuit board cooperating to define a card slot for containing said payment card therein such that said payment card is electrically connected to said card terminal set;

wherein said interface device is operable to switch between a retracted state, in which said first connecting interface is contained in said housing, and an exposed state, in which said first connecting interface protrudes from said housing;

wherein said payment card includes a plurality of standard pins and three near field communication (NFC) pins; and wherein said card terminal set includes:
- a plurality of signal terminals that are spaced apart from each other and are arranged in a row, and that are configured to be electrically and respectively connected to said standard pins of said payment card; and
- two NFC terminals that are spaced apart from one another and are arranged in a different row with respect to the row of said signal terminals, and that are configured to be electrically and respectively connected to said NFC pins of said payment card.

11. The portable interface device assembly of claim 10, wherein:

said circuit board has opposite first and second surfaces, said first terminal set is disposed on said first surface, and said card terminal set is disposed on said second surface; and said card slot is defined cooperatively by said second surface and said first shell member.

12. The portable interface device assembly of claim 10, wherein:

said housing has an elongated shape with a pair of long sides, each of said long sides being formed with an opening;

said switching unit is rotatably disposed in said housing;

said circuit board has an elongated shape with a pair of short sides, one of which being provided with said first connecting interface;

when said interface device is in the retracted state, said circuit board is substantially parallel to said housing, containing said connecting interface in said housing; and when said interface device is in the exposed state, said circuit board is substantially perpendicular to said housing, resulting in said first connecting interface extending out of said housing through one of said openings.

13. The portable interface device assembly of claim 12, further comprising a second connecting interface that is different from said first connecting interface, that is configured to be electrically connected to a second socket of the electronic device, and that includes:

an insulated base fixed on the other one of said short sides of said circuit board;

a second terminal set disposed on said insulated base with a portion that is in electrical contact with said circuit board; and a second shell member connected to said insulated base and covering said second terminal set;

wherein, when said interface device is switched to the exposed state, said second connecting interface extends out of said housing through the other one of said openings.

14. The portable interface device assembly of claim 12, wherein:
said housing includes an inner wall, and a shaft protruding perpendicularly from said inner wall; and
said switching unit includes a base, and a shaft hole formed in said base and rotatably receiving said shaft.

15. The portable interface device assembly of claim 14, wherein:
said housing further includes a first positioning unit that is disposed on said inner wall and that is spaced apart from said shaft;
said switching unit further includes a plurality of second positioning units that are disposed on said base, and that are shaped to engage said first positioning unit;
said second positioning units are arranged around and spaced apart from said shaft hole, and are angularly spaced apart from each other with respect to said shaft hole as a center, adjacent two of said second positioning units being angularly spaced apart from each other by 90 degrees with respect to said shaft hole;
when said interface device is in the retracted state, said first positioning unit engages one of said second positioning units, and when said interface device is in the exposed state, said first positioning unit engages another one of said second positioning units.

16. The portable interface device assembly of claim 10, wherein:
said housing is substantially disk-shaped, and includes a pair of circular walls, and a peripheral wall interconnecting said circular walls and formed with at least one opening; and
when said interface device is in the retracted state, said switching unit is in an inner position on one of said circular walls away from said peripheral wall, and when switching said interface device to the exposed state, said switching unit is moved toward said peripheral wall to an outer position on said one of said circular walls, and said first connecting interface extends out of said housing through said opening.

17. The portable interface device assembly of claim 16, wherein:
a slide groove is formed through said one of said circular walls;
said switching unit has a user-operable unit disposed on said one of said circular walls and a base disposed in said housing for mounting said circuit board; and
said user-operable unit has
a manual operation member disposed outside said housing,
a restricting member disposed in said housing, dimensioned to be unable to move through said slide groove, and connected to said base, and
an interconnecting member disposed movably in said slide groove and interconnecting said manual operation member and said restricting member.

18. The portable interface device assembly of claim 17, wherein said peripheral wall is formed with two openings, said portable interface device assembly further comprising a second connecting interface that is different from said first connecting interface, that is configured to be electrically connected to a second socket of the electronic device, that is mounted to said circuit board opposite to said first connecting interface and that includes:
an insulated base fixed on said circuit board;
a second terminal set disposed on said insulated base with a portion that is in electrical contact with said circuit board; and
a second shell member connected to said insulated base and covering said second terminal set;
wherein, when said interface device is switched to the exposed state, said second connecting interface extends out of said housing through another one of said openings.

* * * * *